May 21, 1940.　　　　M. R. HANNA　　　　2,201,861
RAILWAY TRUCK
Filed Feb. 24, 1938
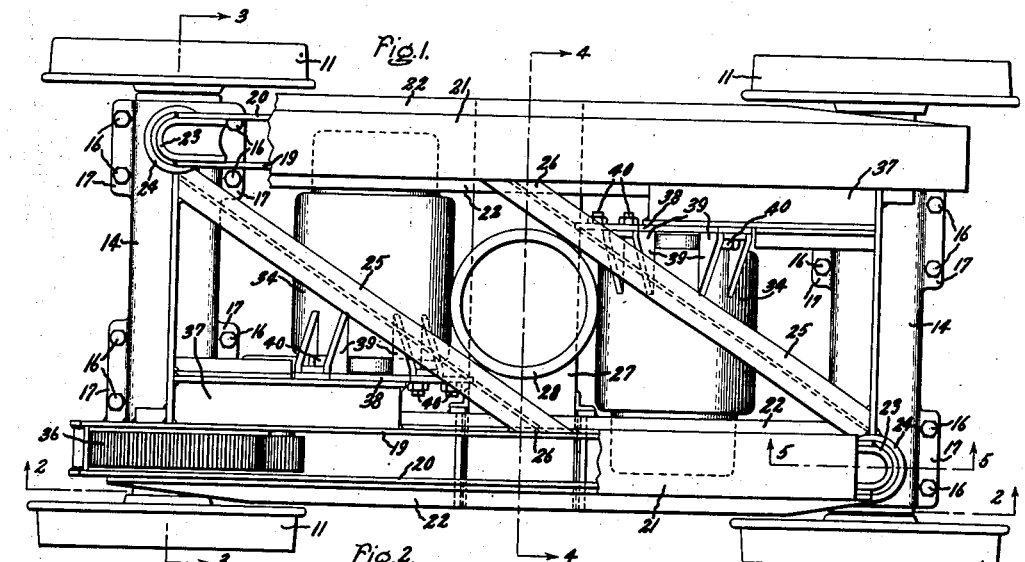
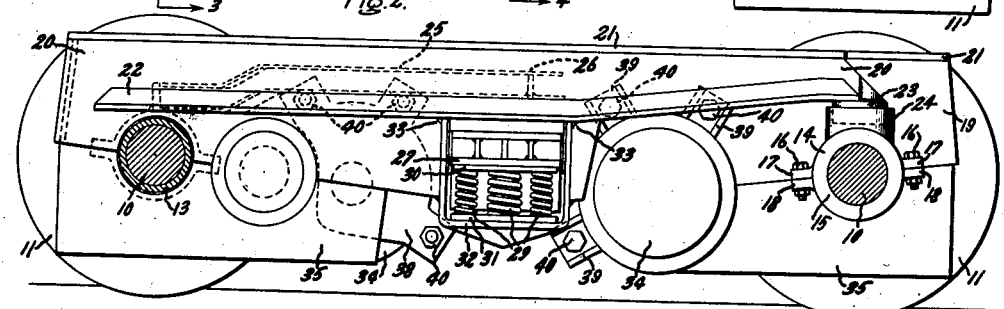
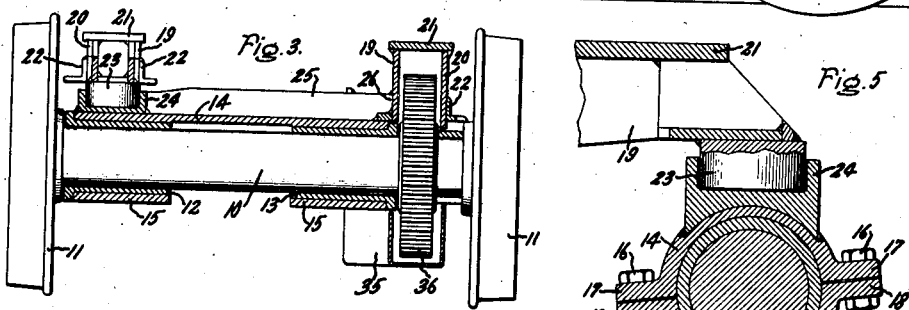
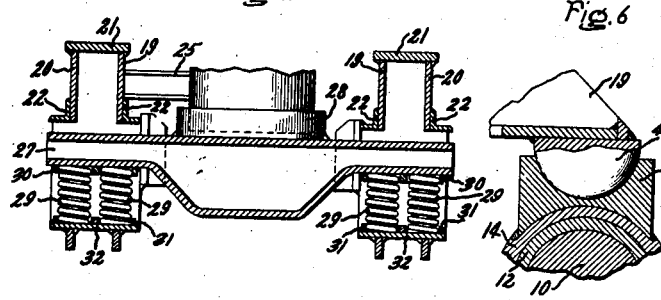
Inventor:
Max R. Hanna,
by Harry E. Dunham
His Attorney.

Patented May 21, 1940

2,201,861

UNITED STATES PATENT OFFICE 2,201,861

RAILWAY TRUCK

Max R. Hanna, Erie, Pa., assignor to General Electric Company, a corporation of New York Application February 24, 1938, Serial No. 192,245

2 Claims. (Cl. 105—133)

My invention relates to trucks for locomotives or cars.

An object of my invention is to provide an improved truck construction.

Further objects and advantages of my invention will become apparent and my invention will be better understood from the following description referring to the accompanying drawing, and the features of novelty which characterize my invention will be pointed out with particularity in the claims annexed to and forming part of this specification.

For a better understanding of my invention, reference is made to the accompanying drawing wherein Fig. 1 is a plan view of a railway truck embodying my invention and partly broken away to better illustrate the gear box arrangement; Fig. 2 is a side elevation taken along line 2—2 of Fig. 1; Fig. 3 is a view partly in section taken along line 3—3 of Fig. 1; Fig. 4 is a sectional view taken along line 4—4 of Fig. 1; Fig. 5 is a sectional view of the pivotal supporting arrangement taken along line 5—5 of Fig. 1; and Fig. 6 is a sectional side elevation of an alternative pivotal side frame supporting arrangement.

Referring to the drawing, I have shown a railway vehicle truck provided with a pair of axles 10 supported by wheels 11. These axles are provided with bearing members including sleeve bearings 12 and 13 supported within split bearing sleeves having upper and lower sections 14 and 15 which are secured together by bolts 16 extending through flanges 17 and 18, respectively. These bearing sleeves form end frames for the truck, and one end of each of these bearing frames at opposite corners of the truck is rigidly and directly secured by welding to a fabricated side frame including vertically arranged plates 19 and 20 secured together at their upper ends by a horizontal plate 21, and provided with longitudinally extending angle members 22 secured adjacent the lower edge of the outer sides of plates 19 and 20. In order to provide for relative lateral displacements between the two axles, the other end of each of the side frames is pivotally supported at opposite corners of the truck on the other end of the other bearing sleeve by a cylindrical bearing 23. These bearings are secured by welding to the ends of each of the side frames and are pivotally mounted on bearing plates 24 rigidly secured by welding to the bearing sleeves at the ends thereof opposite the ends welded to the side frame plates 19 and 20, and are arranged directly over the axles therein. In order to secure more rigidly each side frame to its respective bearing sleeve, a diagonally extending I-beam 25 is rigidly secured by welding to each respective side frame adjacent the center thereof at 26, and rigidly secured by welding at the other end thereof to the upper side of a bearing sleeve adjacent the bearing plate 24 at the pivotal supporting end of the sleeve. A transversely extending bolster 27, provided with a center bearing plate 28, is resiliently supported by a nest of coil springs 29 arranged adjacent each end thereof. These springs are normally in compression between spring seats 30 formed on the under side of each end of the bolster 27 and spring seats 31 secured to the lower side of a U-shaped strap 32, which is rigidly secured by welding at each end 33 thereof to the angle elements 22 of the fabricated side frames adjacent the central part of the side frames.

The truck is arranged to be driven by a pair of driving motors 34 through gearing arranged in a gear box having an outer section 35 rigidly secured to the side frame plates 19 and 20, and includes a gear 36 mounted directly on each of the axles 10. The gear box also includes an inner section 37 which is rigidly secured by welding to the bearing sleeves and to the inner side frame plates 19. A motor supporting plate 38 is rigidly secured by welding to the inner side of this inner gear box 37 and each motor is rigidly secured to its respective gear box and side frame by three mounting brackets 39 arranged in circumferentially spaced apart relation about one end of each motor and secured by bolts 40 to the motor mounting plates 38. Thus, the truck is formed of three principal interconnected and separable parts including the bolster and two side frames rigidly secured to a bearing sleeve supported by an axle and driven through a motor mounted on each respective side frame.

In order to relieve stresses which may be set up in the pivotal bearing support of the side frames on the bearing sleeves caused by relative vertical displacements between the two axles, a universal ball and socket joint may be arranged to support this end of the side frames. Fig. 6 illustrates such an arrangement wherein an hemispherical bearing 41 is secured to the pivotally supported ends of the side frame plates 19 and 20 and is supported in a hemispherical socket bearing plate 42 secured by welding to the bearing sleeve 14.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States, is:

1. A truck for railway vehicles having wheels and axles, bearing members for said axles, truck side frames, means for rigidly and directly securing one end of only one of said side frames to each different one of said bearing members, means for pivotally supporting the other end of each of said side frames on another one of said bearing members, a bolster, means for supporting said bolster on said side frames, driving motors, means for rigidly supporting each of said motors on one of said side frames, and means for providing a driving connection between each of said driving motors and the axle having the bearing member thereof rigidly secured to the side frame supporting said motor, said driving connection being supported by the axle driven thereby.

2. A truck for railway vehicles having a pair of axles, bearing members for said axles, a pair of truck side frames, means for rigidly and directly securing one end of only one of said side frames at opposite corners of said truck to an end of each different one of said bearing members, means for pivotally supporting the other end of each of said side frames at opposite corners of said truck on the other end of the other of said bearing members, a bolster, means for supporting said bolster on said side frames adjacent the central part thereof, a pair of driving motors arranged transversely of said truck, means for supporting each of said motors on a different one of said side frames, a gear casing secured to each of said side frames and to each of said bearing members adjacent the rigidly secured-together ends thereof, and means arranged in each of said gear casings for providing a driving connection between each of said driving motors and the axle having the bearing member thereof rigidly secured to the side frame supporting each motor.

MAX R. HANNA.